UNITED STATES PATENT OFFICE.

JOSIAH B. KENDALL, OF BOSTON, ASSIGNOR TO HIMSELF AND JAMES O. SAFFORD, OF SALEM, MASSACHUSETTS.

IMPROVED OIL FOR CURRIERS' USE.

Specification forming part of Letters Patent No. 91,446, dated June 15, 1869.

*To all whom it may concern:*

Be it known that I, JOSIAH B. KENDALL, of Boston, in the county of Suffolk and State of Massachusetts, have invented an Improved Oil for Curriers' Use, and process of compounding the same; and I hereby declare that the following is a full, clear, and exact description thereof.

My invention has for its object to produce an oil for curriers' use which will render the leather soft and pliable, and also increase its weight to a greater degree than the ordinary stuffing used for this purpose, the nature of the composition and the manner of compounding it being such that the ingredients will permanently remain together, thus avoiding the usual separation of the oleaginous substance from the water.

To enable others skilled in the art to understand and use my invention, I will proceed to describe the manner in which I have carried it out.

Take one hundred (100) gallons of fish-oil, and heat it by steam or otherwise in a suitable kettle. When sufficiently hot add twenty-five (25) gallons of palm-oil, of the specific gravity of eight (8) pounds to the gallon, and one thousand (1,000) pounds of rosin, broken into small pieces, equal to one hundred and twenty-five (125) gallons at eight (8) pounds to the gallon. The mixture is maintained at a constant heat and stirred until all is dissolved, after which the stirring is continued until it is perfectly cool.

In a separate kettle I dissolve thirty-one and one-fourth ($31\frac{1}{4}$) pounds of potash in sixty-two and one-half ($62\frac{1}{2}$) gallons of warm water, and also allow the same to become cool.

Any other suitable alkali may be used instead of the potash, if desired.

These two mixtures, the contents of the two kettles, in a cold state are now united, and stirred from six (6) to twenty-four (24) hours, when the mixture may be drawn off, ready for use.

By thus mixing the alkaline solution with the oleaginous and resinous substances in a cold state, as above described, their complete and permanent amalgamation is insured, and the separation of the oleaginous substance from the water is entirely avoided.

I do not limit myself to the particular ingredients above specified, as any equivalents thereof may be used instead. For instance, paraffine, crude or refined petroleum, tallow, or other oleaginous vegetable or animal substance may be substituted for the fish and palm oil, and any other suitable resinous substance may be employed in lieu of the rosin; and the proportions of the ingredients may be slightly varied without departing from the spirit of my invention.

The above-described oil possesses no properties injurious to the leather, but renders it soft and pliable, and, furthermore, increases its weight to a greater degree than the stuffing ordinarily used for this purpose.

Claim.

What I claim as my invention, and desire to secure by Letters Patent, is—

An oil or stuffing for curriers' use consisting of oleaginous and resinous substances, in combination with an alkaline solution, prepared in the manner substantially as set forth.

JOSIAH B. KENDALL.

Witnesses:
F. SHAW,
W. J. CAMBRIDGE.